US007647622B1

(12) United States Patent
Sobel et al.

(10) Patent No.: US 7,647,622 B1
(45) Date of Patent: Jan. 12, 2010

(54) DYNAMIC SECURITY POLICY THROUGH USE OF EMPIRICAL SECURITY EVENTS

(75) Inventors: William E. Sobel, Stevenson Ranch, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 827 days.

(21) Appl. No.: 11/112,192

(22) Filed: Apr. 22, 2005

(51) Int. Cl.
*G06F 17/00* (2006.01)
*G06F 12/14* (2006.01)
*G06F 15/16* (2006.01)
*H04L 9/00* (2006.01)
*H04L 12/22* (2006.01)
*H04L 29/00* (2006.01)

(52) U.S. Cl. .............................. 726/1; 726/24; 709/229
(58) Field of Classification Search ....................... 726/1
See application file for complete search history.

(56) References Cited

U.S. PATENT DOCUMENTS

2006/0206615 A1* 9/2006 Zheng et al. ................. 709/229

2006/0224742 A1* 10/2006 Shahbazi ..................... 709/226

FOREIGN PATENT DOCUMENTS

WO    WO 0143392 A2 *   6/2001

OTHER PUBLICATIONS

Paul Madsen, Yuzo Koga, Kenji Takahashi, "Federated identity management for protecting users from ID theft", Nov. 2005, DIM '05: Proceedings of the 2005 workshop on Digital identity management, Publisher: ACM, pp. 77-83.*
"*Symantec Enterprise Security Manager*", pp. 1-2 [online]. Retrieved from the Internet:<URL:http://enterprisesecurity.symantec.com/products/products.cfm?ProductID=45>.

* cited by examiner

*Primary Examiner*—Emmanuel L Moise
*Assistant Examiner*—Courtney D Fields
(74) *Attorney, Agent, or Firm*—Gunnison, McKay & Hodgson, L.L.P.; Serge J. Hodgson

(57) ABSTRACT

Risk events occurring on a computer system are logged over time and a risk profile is dynamically generated and updated based on the logged risk events. In one embodiment, a security policy is dynamically set and updated based on the risk profile.

17 Claims, 4 Drawing Sheets

DYNAMIC SECURITY POLICY THROUGH USE OF EMPIRICAL SECURITY EVENTS

BACKGROUND OF THE INVENTION

1. Field of the Invention

The present invention relates to the protection of computer systems. More particularly, the present invention relates to risk profiling and security policy setting.

2. Description of Related Art

Broadly viewed, a security policy defines the access and use of various resources, such as computer system resources. A security policy for a computer system is typically determined by a user and/or a system administrator. Developing a useful security policy can be a difficult task.

Much of the difficulty in developing a useful security policy arises from the attempt to cover a dynamic set of circumstances, environment, and users with a static security policy. Often some environments present more risk than others and some users are more prone to risky behaviors than other users.

SUMMARY OF THE INVENTION

In accordance with one embodiment, a method includes logging risk factors associated with a computer system and/or a user over time and dynamically generating a risk profile for the computer system and/or the user based on the logged risk factors. In one embodiment, the method further includes dynamically setting and updating a security policy based on at least a portion of the risk profile. In some embodiments, at least a portion of the risk profile is made available to other applications for use in decision making, such as setting a security policy.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

A security policy is often implemented by a user or system administrator using a selected computer security product or products. Examples of computer security products that implement a security policy include, but are not limited to, firewall products, AV (anti-virus) products, HIDS (host intrusion detection system) products, NIDS (network intrusion detection system) products, parental control products, anti-spam products, and e-mail security products.

Conventionally, these computer security products provide an initial default security policy setting that is the same for all computer systems and users. However, as the environment in which computer systems and users operate dynamically changes, the application of a static security policy can lead to security compromises when a security policy setting is too permissive and can hinder productivity and usability when a security policy setting is overly rigid.

While some computer security products permit a user to manually change the default security policy setting through a menu selection process, the change is made at the user's discretion. Thus, the change may not reflect the actual risk environment in which the computer system operates. Further, the changed security policy setting is a static setting until manually changed again by the user.

Generally viewed, embodiments in accordance with the invention use empirical security related information for the initial and ongoing determination of a security policy for a computer system and/or a user. In one embodiment, individual items of security related information, herein termed risk factors, are logged to a database over time on a continuing basis and used in dynamically generating and updating a risk profile for a computer system and/or a user.

The risk profile depicts the risk environment of the computer system and/or the riskiness of the user based on the logged risk factors. In one embodiment, the risk profile is composed of one or more risk categories that depict a categorized view of the risk environment based on risk factors selectively associated with each risk category.

In one embodiment, the risk profile is used to dynamically set and update a security policy, e.g., a security policy setting, permitting security policy aggressiveness for an associated computer system and/or a user to be dynamically increased or decreased over time based on the risk profile.

Figure 2:
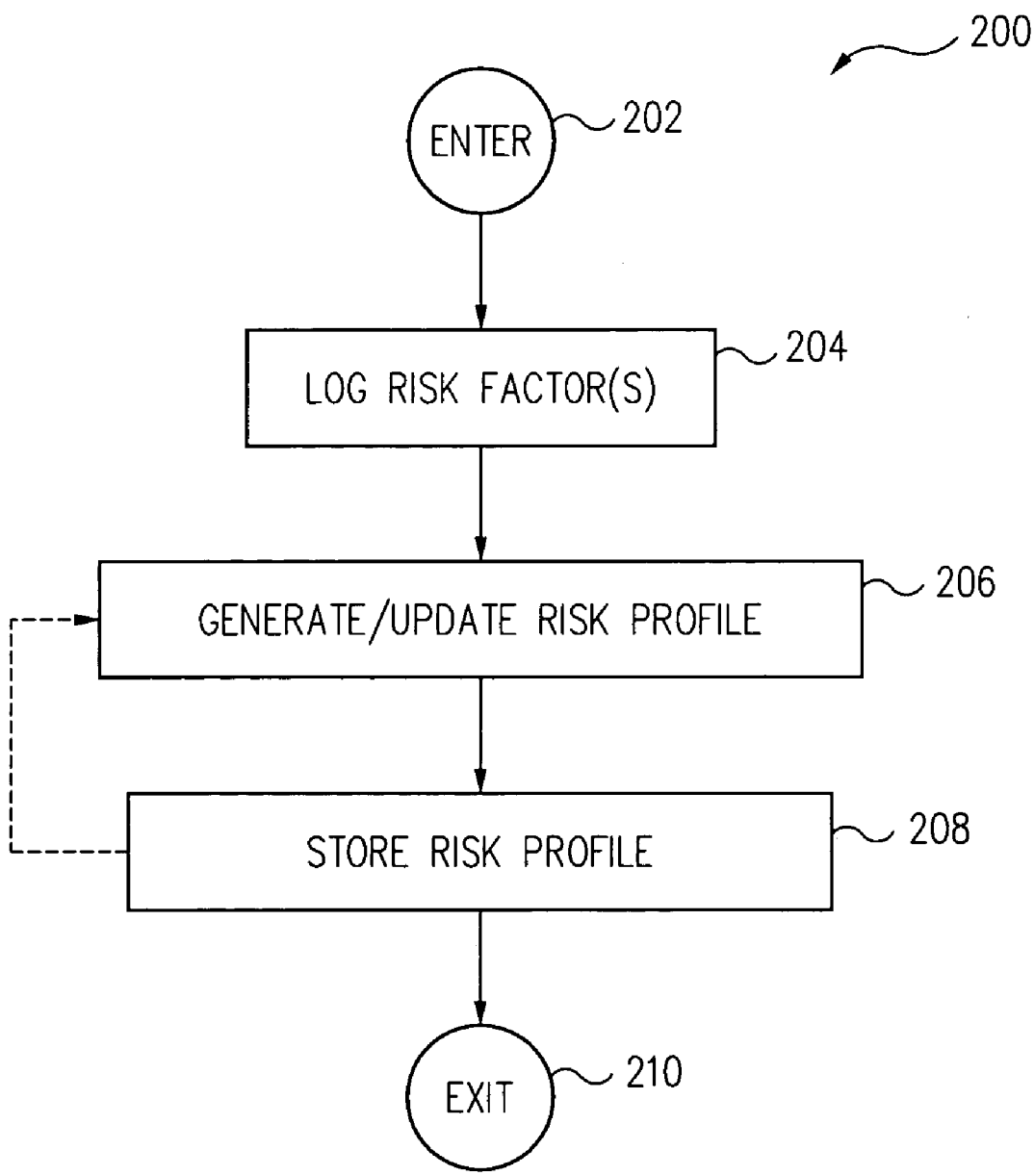
FIG. 2 illustrates a flow diagram of a method for dynamically generating a risk profile in accordance with one embodiment of the invention.

Referring generally to FIG. 2, in one embodiment, one or more risk factors occurring on a computer system are logged to a risk profile database over time (operation 204). A risk profile is generated for the computer system and/or a user (operation 206) based on the logged risk factors, and stored (operation 208). In one embodiment, referring generally to FIG. 3, the risk profile is accessed (operation 304) and used to dynamically set or update a security policy, such as default security policy setting, for the computer system and/or the user (operation 306).

Figure 1:
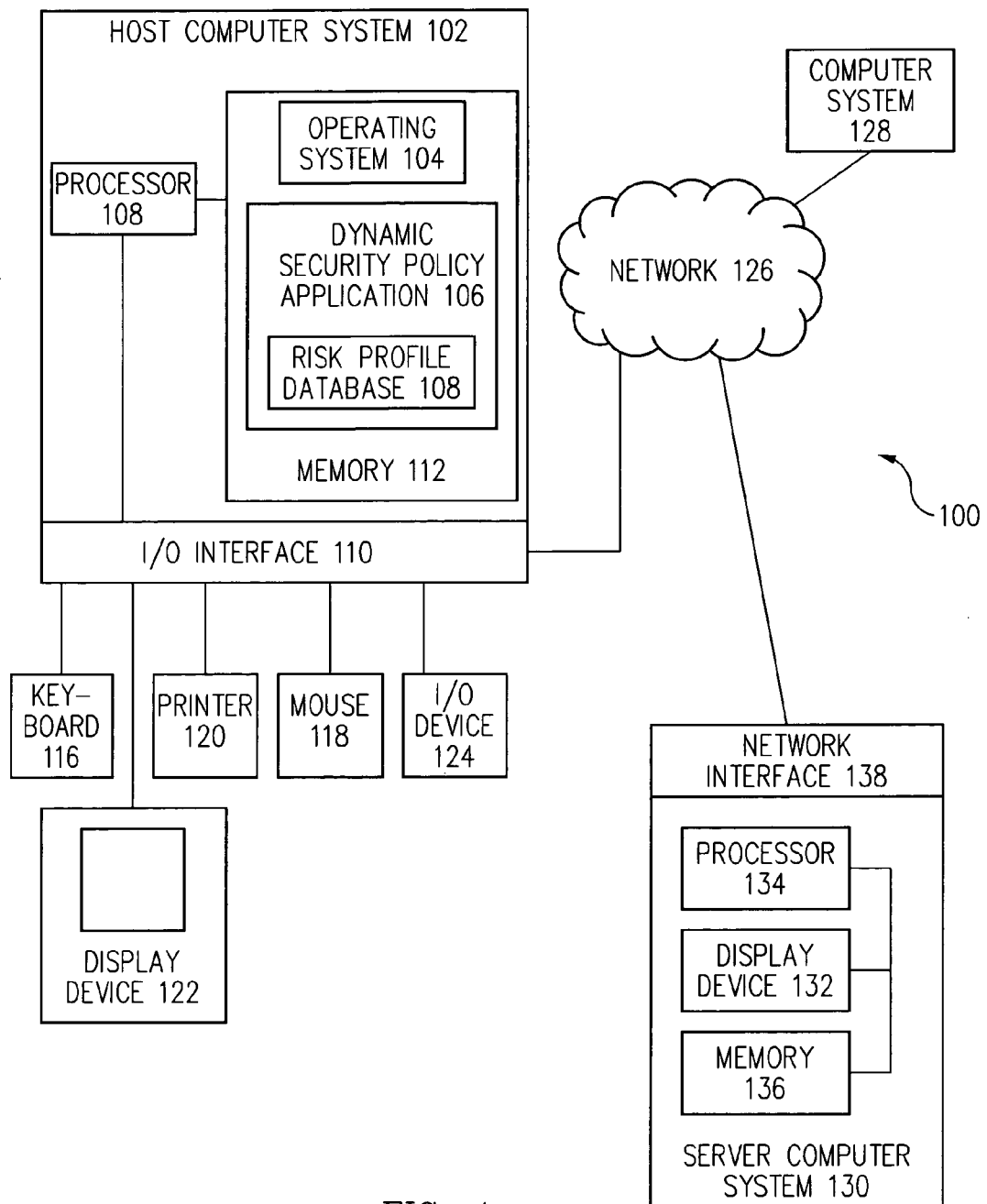
FIG. 1 illustrates a client-server system that includes a dynamic security policy application executing on a host computer system in accordance with one embodiment of the invention.

More particularly, FIG. 1 illustrates a client-server system that includes a dynamic security policy application executing on a host computer system in accordance with one embodiment of the invention. Host computer system 102, can be a stand-alone computer system, such as a personal computer or workstation, as illustrated in FIG. 1. Host computer system 102 (e.g., a first computer system) can also be part of a client-server configuration that is also illustrated in FIG. 1 in which host computer system 102 interacts with a server computer system 130 (e.g., a second computer system) via a network 126. Network 126 can be any network or network system that is of interest to a user, for example, the Internet.

Dynamic security policy application 106 is described herein as executed on host computer system 102, however, in light of this disclosure, those of skill in the art can understand that the description is applicable to a client-server system as well. Host computer system 102 typically includes a central processing unit (CPU) 108, hereinafter processor 108, an input/output (I/O) interface 110, an operating system 104, and a memory 112.

Host computer system 102 may further include standard devices, such as a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from host computer system 102. In one embodiment, memory 112 includes a main memory, as well as any supplemental memories, and includes executable areas, data storage areas, and any memory areas needed by host computer system 102.

In one embodiment, dynamic security policy application 106 is loaded into host computer system 102 via I/O device 124, such as from a CD, DVD or floppy disk containing dynamic security policy application 106. In other embodiments, such as client-server embodiments, dynamic security policy application 106 can be downloaded into host computer system 102 from server computer system 130 via network 126. Server computer system 130 can further include: a network interface 138 for communicating with network 126; a memory 136; a processor 134; and a display device 132. In various embodiments, network interface 138 and I/O interface 110 include analog modems, digital modems, or a network interface card.

In FIG. 1, host computer system 102 is also coupled to a computer system 128 by network 126, from which malicious code may be received, such as via an infected file containing malicious code. Herein, in one embodiment, malicious code is defined as any computer program, module, set of modules, or code that enters a computer system environment without an authorized user's knowledge and/or without an authorized user's consent. A computer virus is one example of malicious code.

In one embodiment, computer system 128 is similar to host computer system 102, for example, includes a central processing unit, an input/output (I/O) interface and a memory. Computer system 128 may further include standard devices like a keyboard, a mouse, a printer, a display device, and an I/O device(s). The various hardware components of computer system 128 are not illustrated to avoid detracting from the principles of the invention.

In the present embodiment, dynamic security policy application 106 is stored in memory 112 of host computer system 102 and executed on host computer system 102. The particular type and configuration of host computer system 102, server computer system 130, and computer system 128 are not essential to this embodiment of the present invention.

FIG. 2 is a flow diagram of a method 200 for dynamically generating a risk profile in accordance with one embodiment of the present invention. In the present embodiment, empirical security related information, herein termed risk factors, associated with a computer system and/or a user of a computer system is logged and used in generating a risk profile for the computer system and/or the user. In one embodiment, the risk profile includes one or more risk categories that collectively represent the risk profile. In one embodiment, the risk profile and risk categories are accessible for use in decision making, such as setting and/or updating default initial security policy settings.

In the present embodiment, risk factors are logged over time to a database, e.g., to a risk profile database 108 (FIG. 1), and used in generating a risk profile. As the risk profile is dynamically generated and updated, accessing the risk profile permits security policies to be dynamically updated in accordance with the current risk profile.

Referring now to FIGS. 1 and 2 together, in one embodiment, execution of dynamic security policy application 106 on host computer system 102 results in the operations of method 200 as described below in one embodiment. In one embodiment, dynamic security policy application 106 including method 200 is loaded on host computer system 102 and method 200 is entered at an ENTER operation 202.

In one embodiment, dynamic security policy application 106 can be part of another security application having one or more security policies. One example of a security application having one or more security policies is Norton Internet Security (available from Symantec Corporation, Cupertino, Calif.).

During loading, dynamic security policy application 106 initializes connections needed to obtain risk factor data, for example, through function hooking, file system event interception, and data monitoring. From ENTER operation 202, processing transitions to a LOG RISK FACTOR(S) operation 204.

In LOG RISK FACTOR(S) operation 204, in one embodiment, one or more risk factors occurring on a computer system, e.g., host computer system 102, are logged to a memory structure, for example, to a database, e.g., risk profile database 108. In one embodiment, the risk profile database is stored in a memory structure of host computer system 102, e.g., risk profile database 108. In another embodiment, the risk profile database is stored in a memory structure located elsewhere, such as in server computer system 130.

Herein, in one embodiment, a risk factor is an item of empirical security related information that is used in generating a risk profile for a computer system and/or a user. More particularly, in one embodiment, a risk factor is an item of empirical security related information that is used in generating a risk profile for a computer system and/or a user and is observable, or otherwise recordable, from events or other information available on, or occurring on, a computer system.

In one embodiment, on initial startup, dynamic security policy application 106 performs an initial security assessment of host computer system 102. In one embodiment, dynamic security policy application 106 performs one or more security evaluation procedures, such as a virus scan, a vulnerability assessment, and/or log reviews, to obtain an initial set of risk factors associated with host computer system 102 and/or a user of host computer system 102. In some embodiments, dynamic security policy application 106 determines current security products on host computer system 102 and initiates one or more security evaluation procedures using those security products to obtain risk factors.

In one embodiment, the risk factors obtained in the initial security assessment are logged to a risk profile database, e.g., risk profile database 108, and subsequently occurring risk factors are logged to the risk profile database over time. Thus, risk factors are logged over time as an ongoing process to the risk profile database.

As earlier described, in one embodiment, a risk factor is empirical security related information that is used in generating a risk profile for a computer system and/or a user. Some examples of risk factors are described below.

In one embodiment, a risk factor includes virus detections. For example, in one embodiment, virus detections include detections of a virus, such as recorded in a log on host computer system 102.

In one embodiment, a risk factor includes intrusion detections. For example, in one embodiment, intrusion detections include detections of intrusion attempts and intrusion successes on host computer system 102, such as recorded in a log on host computer system 102.

In one embodiment, a risk factor includes security audit results. For example, in one embodiment, security audit results include detections of security policy audit failures, security policy non-compliant software or security policy non-compliant activities on host computer system 102, such as recorded in a log on host computer system 102.

In one embodiment, a risk factor includes security patch installation information. For example, in one embodiment, security patch installation information includes detections of security patch installations on host computer system 102, such as recorded in a log on host computer system 102.

In one embodiment, a risk factor includes vulnerability assessment results. For example, in one embodiment, vulnerability assessment results include detections of unnecessary services or vulnerable services on host computer system 102, such as recorded in a log on host computer system 102.

In one embodiment, a risk factor includes selected e-mail activity. For example, in one embodiment, selected e-mail activity includes a detection of receipt of an e-mail with an executable attachment that is executed on host computer system 102, such as recorded in a log on host computer system 102.

In one embodiment, a risk factor includes other selected activity. For example, in one embodiment, other selected activity includes detection of a download and execution of unsigned ActiveX controls or other executable content, and installation of security software or security software upgrades on host computer system 102, such as recorded in a log on host computer system 102.

In one embodiment, a risk factor includes an asset valuation. For example, in one embodiment, an asset valuation is a value input by a user, such as a system administrator, that assigns a relative measure of value to a computer system and/or the assets, such as sensitive data, stored on the computer system.

Thus, risk factors can be selectively defined in dynamic security policy application 106 to support evaluation of a risk environment for a computer system and/or a user. And, in the case of the user, risk factors can be collected that support evaluation of the user's behavior, e.g., risky or safe.

The above examples of risk factors are used in describing the present invention, and are not intended to limit the scope of risk factors utilized in the present invention. In various embodiments, one or more of the above risk factors, as well as fewer, more, or different risk factors can be used.

In one embodiment, when a risk factor is logged to the risk profile database, it is associated with a selected risk category, for example, using a predetermined tag or other identifier that is logged in the risk profile database. In some embodiments, each risk factor can be further associated with other parameters, such as a computer identifier and/or a user identifier. Tagging a risk factor enables it to be identified for use in generating a risk category of the risk profile associated with the computer system and/or the user. From LOG RISK FACTOR(S) operation 204, processing transitions to a GENERATE/UPDATE RISK PROFILE operation 206.

In GENERATE/UPDATE RISK PROFILE operation 206, the logged risk factors are utilized in generating a risk profile. More particularly, in one embodiment, some or all of the logged risk factors are used in generating associated risk categories that collectively represent the risk profile. Herein a risk profile is a detailed risk characterization for a computer system and/or a user.

In one embodiment, the initially logged risk factors in the risk profile database are utilized in generating an initial risk profile for host computer system 102 and/or a user of host computer system 102. As earlier described, in one embodiment, the risk profile includes one or more risk categories. Herein in one embodiment, a risk category is a component of the risk profile generated using risk factors respectively associated with the risk category, e.g., in accordance with the tags. In one embodiment, each risk category includes an associated risk measure. Herein in one embodiment, a risk measure is a metric used to illustrate a respective risk environment for a risk category.

Individual risk categories can utilize risk measures having different metrics. For example, a risk measure can be a true/false determination, a selected risk factor count, a listing, an identifier, a ratio, a monetary value, or another meaningful metric. Some examples of risk categories are described below.

In one embodiment, the risk profile includes a virus risk category having a virus risk measure generated using risk factors corresponding to virus detections. For example, in one embodiment, the virus risk measure can be the number of risk factors associated with virus detections over a specified time period. Thus, if a computer system has twelve (12) risk factors indicating virus detections, and another computer system has only one (1) risk factor indicating a virus detection, the virus risk measure generated for the former computer system would be higher than the virus risk measure generated for the latter computer system.

In one embodiment, the risk profile includes an intrusion risk category having an intrusion risk measure generated using risk factors corresponding to intrusion detections. For example, in one embodiment, the intrusion risk measure can be the number of risk factors associated with intrusion detections over a specified time period. Thus, if a computer system has two (2) risk factors indicating intrusion detections, and another computer system has no risk factors indicating an intrusion detection, the intrusion risk measure generated for the former computer system would be higher than the intrusion risk measure generated for the latter computer system.

In one embodiment, the risk profile includes a security audit risk category having a security audit risk measure generated using risk factors corresponding to security audit results. For example, in one embodiment, the security audit risk measure can be the number of risk factors associated with security audit results security audit failures over a specified time period. Thus, if a computer system has no risk factors indicating no detections of security audit failures, and another computer system has ten (10) risk factors indicating detections of security audit failures, the security audit risk measure for the former computer system would be lower, e.g., greater compliance and thus lower risk, than the security audit risk measure generated for the latter computer system.

In one embodiment, the risk profile includes a security patch installation risk category including a security patch installation risk measure generated using risk factors corresponding to security patch installation information. For example, in one embodiment, the security patch installation risk measure can be the number of risk factors associated with detections of security patch installations together with the number of security patch installations that should be present. Thus, if a computer system has risk factors indicating that all current security patches are installed, and another computer system has risk factors indicating that only half of the current security patches are installed, the security patch installation risk measure generated for the former computer system would be lower, e.g., less risk, than the security patch installation risk measure generated for the latter computer system.

In one embodiment, the risk profile includes a vulnerability risk category including a vulnerability risk measure generated using risk factors corresponding to vulnerability assessment results. For example, in one embodiment, the vulnerability risk measure can be the number of risk factors associated with detections of vulnerable service use. Thus, if a computer system has twenty (20) risk factors indicating use of vulnerable services and another computer system has only one (1) risk factor indicating use of vulnerable services, the vulnerability risk measure generated for the former computer system would be higher than the vulnerability risk measure generated for the latter computer system.

In one embodiment, the risk profile includes an e-mail risk category having an e-mail risk measure generated using risk factors corresponding to selected e-mail activity. For example, in one embodiment, the e-mail risk measure can be the number of risk factors associated with execution of executable files included in downloaded e-mails by a user. Thus, if a user has thirty (30) risk factors indicating execution of an executable file from a downloaded e-mail, and another user has only one (1) risk factor indicating execution of an executable file from a downloaded e-mail, the e-mail risk measure generated for the former user would be higher than the e-mail risk measure generated for the latter user.

In one embodiment, the risk profile includes an asset valuation category including an asset valuation risk measure. For example, in one embodiment, an asset valuation risk measure is a value input by a user, such as a system administrator, that assigns a relative measure of value to a computer system and/or the assets, such as sensitive data, stored on the computer system. Thus, for example, an expensive, high-speed computer system that processes very confidential information would receive a higher asset valuation risk measure than an older, low speed computer system used to access Internet sites from a break-room.

In one embodiment, the risk profile includes one or more correlated risk categories including correlated risk measures generated using selected risk factors that are related. For example, in one embodiment, a correlated risk measure can include the number of times a risk factor corresponding to utilization of a vulnerable service occurs where a security patch for the vulnerable service was not installed, and where a virus related to that vulnerable service was detected, e.g., a correlation. Thus, if a computer system has five (5) correlations of this type, and another computer system has only one (1) correlation, the particular correlated risk measure generated for the former computer system would be higher than the particular correlated risk measure generated for the latter computer system.

As another example, in one embodiment a correlated risk measure can include the number of times a risk factor corresponding to download of an e-mail including an executable file by a user occurs where the user opens the executable file and where a virus is detected on the computer system the user is logged into at the time. Thus, if a user has ten (10) correlations of this type, and another user has no (0) correlations, the particular correlated risk measure generated for the former user would be higher, e.g., a risky user, than the particular correlated risk measure generated for the latter user.

In one embodiment, the risk profile includes a combined assessment risk category including a combined assessment measure. In one embodiment, the combined assessment measure is a single valuation based on some or all of the risk factors or some or all of the risk measures of the risk categories (excluding the combined assessment risk category) for a computer system and/or a user. If risk measures are expressed as different metrics, the risk measures can be converted to a common metric, such as by using one or more conversion tables.

For example, assume a risk profile for a computer system includes five (5) risk categories (excluding the combined assessment risk category) and each respective risk measure is expressed as a number count, e.g., a common metric of a number of associated risk factors in the risk profile database for each risk category. In this example, each risk measure is converted using a conversion table to a risk rating based on a scale of zero (0) to ten (10), where zero (0) represents a rating defined as a safe environment and ten (10) represents a high risk environment. After conversion, the risk ratings are averaged and the resulting risk rating is used as the combined assessment risk measure.

In another example, assume a risk profile for a computer system includes five (5) risk categories (excluding the combined assessment risk category) where each respective risk measure indicates a low security risk, and the user currently logged onto the computer system has a user risk profile of three (3) risk categories (excluding the combined assessment risk category) where each respective risk measure indicates a high security risk. In one embodiment, the risk measures of the computer system are factored with the risk measures of the user and a combined assessment risk measure is generated for the combination of the computer system and the user. Thus, in the present example, even though the computer system presents a low risk environment, the current user indicates risky behavior and thus the combined assessment risk measure is higher than if a less risky user was using the computer system.

The above examples of risk categories are used in describing the present invention, and are not intended to limit the scope of risk categories utilized in the present invention. In various embodiments, one or more of the above risk categories, as well as fewer, more, or different risk categories can be generated.

Thus, in the present embodiment, selected risk factors are utilized in generating one or more risk categories, each having a risk measure, that collectively represent the risk profile for a computer system and/or a user. In one embodiment, the risk profile is generated in a standardized, i.e., a predetermined, format so that different applications accessing some or all of the risk profile can readily understand and utilize the risk profile information in decision making, such as in setting a security policy. Further as a risk profile can be associated with a computer system or a user, the risk profile can move with the computer system and the user. In particular, the security policy of a computer system can be dynamically set and/or updated as different users log onto the computer system.

Following initial generation of the risk profile, the risk profile is dynamically updated utilizing the logged risk factors. In one embodiment, as each risk factor is entered in the risk profile database, each of the risk categories is reevaluated, and the risk profile is updated. In various embodiments, the risk profile is updated upon receipt of a risk profile query, at a set time period, on demand, or upon occurrence of a specified event. From GENERATE/UPDATE RISK PROFILE operation 206, processing transitions to a STORE RISK PROFILE operation 208.

In STORE RISK PROFILE operation 208, the risk profile is stored. In one embodiment, the risk profile is stored as part of dynamic security policy application 106 and/or as part of risk profile database 108. However, in other embodiments, the risk profile can be stored elsewhere on host computer system 102 or on another system accessible by dynamic security policy application 106, such as on server computer system 130.

Storing the risk profile at a memory location accessible by different computer systems and/or by the system administrator permits the risk profile to track with an associated computer system and an associated user. Thus, for example, as a user moves from one computer system to another, the risk profile associated with the user can be accessed and utilized in setting and/or updating the security policy at each computer system, i.e., the user's risk profile moves with the user. This permits security policies on computer systems to be dynamically adjusted when, for example, a very risky user is newly assigned to what was earlier a low security risk computer system. From STORE RISK PROFILE operation 208, processing transitions to an EXIT operation 210, or optionally returns to operation 206, and updates the risk profile.

Figure 3:
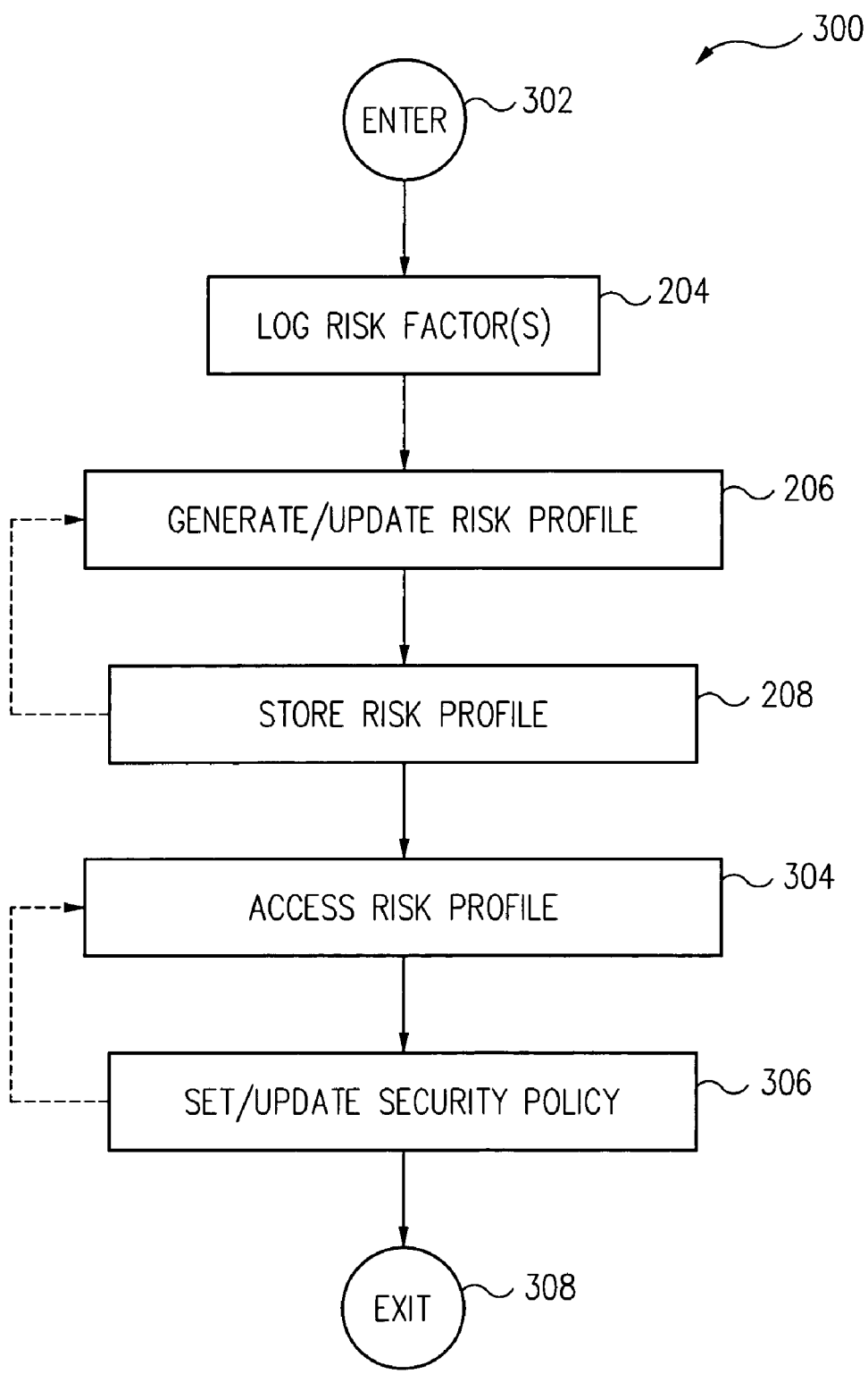
FIG. 3 illustrates a flow diagram of a method for dynamically setting a security policy in accordance with one embodiment of the invention.

In one embodiment, the risk profile is used to dynamically set a security policy for host computer system 102 and/or a user as further described herein with reference to FIG. 3 and a method 300.

FIG. 3 illustrates a flow diagram of a method 300 for dynamically setting a security policy in accordance with one embodiment of the invention. Referring now to FIGS. 1, 2 and 3 together, in one embodiment, execution of dynamic security policy application 106 on host computer system 102 results in the operations of method 300 as described below in one embodiment.

In one embodiment, dynamic security policy application 106 including method 300 is loaded on host computer system 102 and method 300 is entered at an ENTER operation 302. As earlier described with reference to FIG. 2 and method 200, in one embodiment, dynamic security policy application 106 can be part of a security application having one or more security policies. One example of a security application having one or more security policies is Norton Internet Security (available from Symantec Corporation, Cupertino, Calif.).

During loading, dynamic security policy application 106 initializes connections needed to obtain risk factor data, for example, through function hooking, file system event interception, and data monitoring. From ENTER operation 302, processing transitions through operations 204, 206, and 208 as earlier described with reference to FIG. 2 and method 200, and incorporated herein by reference. From STORE RISK PROFILE operation 208, processing transitions to an ACCESS RISK PROFILE operation 304.

In ACCESS RISK PROFILE operation 304, the risk profile is accessed. More particularly, some of the risk profile, such as one or more specified risk categories, or all of the risk profile is accessed, e.g., in response to a query. In one embodiment, the risk profile is accessed by dynamic security policy application 106 for use in setting one or more security policies on host computer system 102 and/or for a user. From ACCESS RISK PROFILE operation 304, processing transitions to a SET/UPDATE SECURITY POLICY operation 306.

In SET/UPDATE SECURITY POLICY operation 306, a security policy for the computer system and/or user is dynamically set/updated. Herein use of the term security policy includes one or more security policies. In one embodiment, dynamic security policy application 106 accesses the risk profile, or selected risk categories, and sets/updates one or more security policies for host computer system 102 and/or a user. In one embodiment, the risk profile associated with host computer system 102 and/or the risk profile associated with a user is used to set the default initial security settings of host computer system 102.

For example, a low risk user, i.e., a user having a risk profile indicating they present a low security risk, can have less restrictive default initial security settings on host computer system 102, or on another computer system they are using, than a high risk user, i.e., a user having a risk profile indicating they present a high security risk.

In another example, a computer system having a risk profile indicating a high security risk environment can have highly restrictive default initial security settings. Differently, a computer system having a risk profile indicating a low security risk environment can have less restrictive default initial security settings.

In yet another example, both the risk profile of host computer system 102 and the risk profile of the user are used to determine the default initial security settings of host computer system 102. Thus, even though the risk profile associated with host computer system 102 may indicate a low security risk environment, a user having a risk profile indicating they present a high security risk can result in restrictive default initial security settings being set on host computer system 102.

In one embodiment, dynamic security policy application 106 dynamically sets and updates security policies utilized by a security application, such as Norton Internet Security, utilizing one or more risk categories of the risk profile. For example, in one embodiment, dynamic security policy application 106 dynamically updates the security policies for the anti-spam, firewall, antivirus, and intrusion detection categories based on some or all of the risk categories available in the risk profile.

In some embodiments, the risk profile can be used to set the tone of the warning message and/or to present a default action to a user. For example, if a user has displayed poor judgment in the past that has resulted in infection under similar circumstances, the risk profile can be used to select a displayed warning message that is stern and the default recommended action can be to block the action. Differently, if a user has a low risk profile, a more benign warning message is selected for display.

In some embodiments, a risk profile can be used to optimize security policies. For example, in one embodiment, risk profiles of computer systems and/or users are used, such as by a system administrator, to prioritize distribution of virus definitions, e.g., higher risk computer systems/users are first to receive new definitions. In one embodiment, risk profiles of computer systems and/or users are used in selecting security products, security product application, and security product aggressiveness. From SET/UPDATE SECURITY POLICY operation 306, processing transitions to an EXIT operation 308, or optionally returns to operation 304 and accesses the risk profile.

Herein dynamic security policy application 106 and methods 200 and 300 have been described with reference to implementation on a host computer system, e.g., host computer system 102. However, in other embodiments, dynamic security policy application 106 and methods 200 and 300 can be applied to a computer system including a plurality of computer systems as further described herein with reference to FIG. 4.

Figure 4:
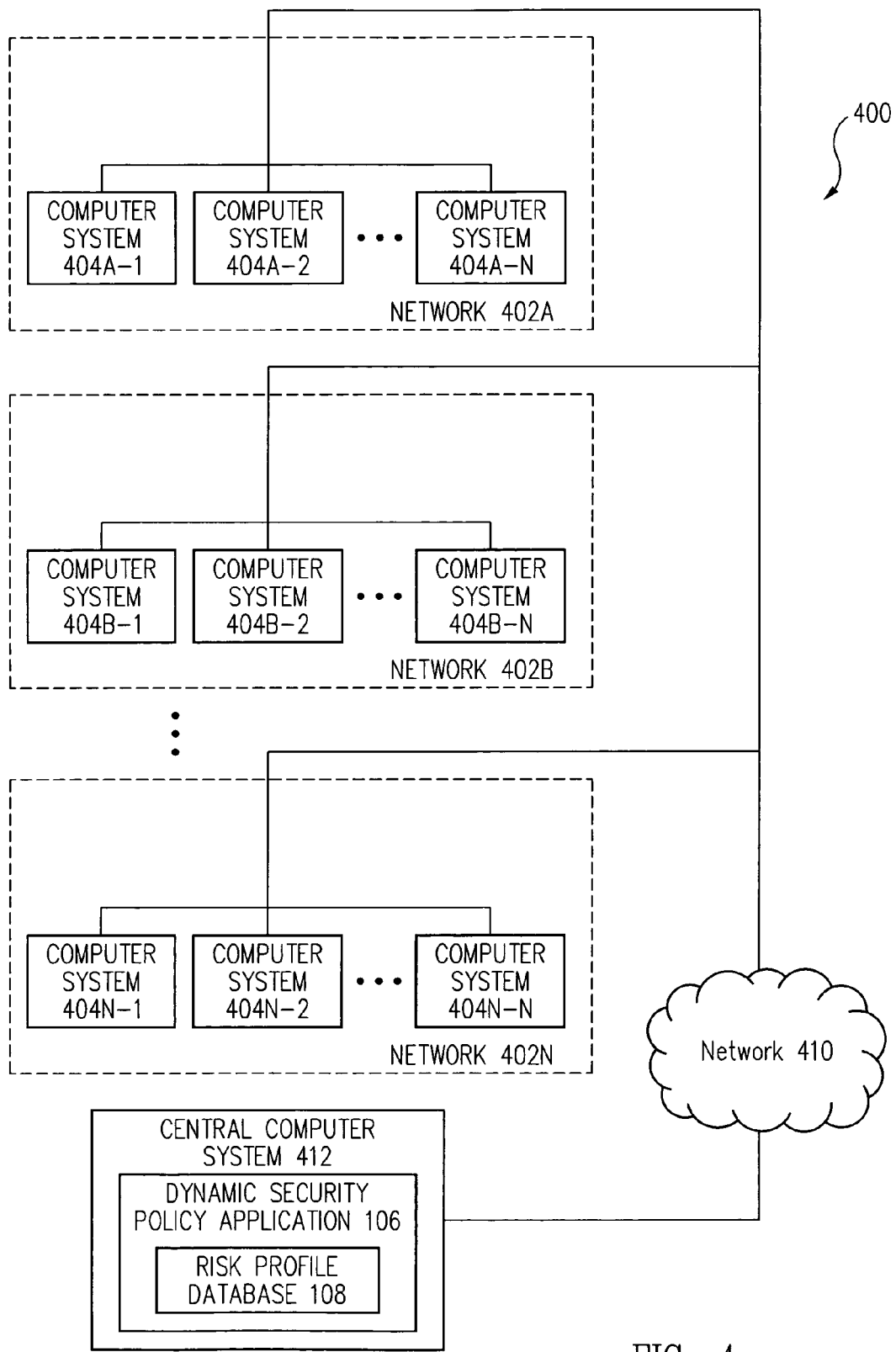
FIG. 4 illustrates a diagram of a computer system that includes the dynamic security policy application executing on a central computer system in accordance with one embodiment of the invention.

FIG. 4 illustrates a diagram of a computer system 400 that includes dynamic security policy application 106 executing on a central computer system 412 in accordance with one embodiment of the invention. As illustrated, computer system 400 includes a plurality of computers interconnected via a network 410. In particular, computer system 400 includes a plurality of networks 402A through 402N, collectively networks 402.

Referring to network 402A, network 402A includes a plurality of interconnected computer systems 404A-1 through 404A-N, collectively computer systems 404A. Similarly, networks 402B through 402N also include a plurality of interconnected computer systems 404B-1 through 404B-N, through 404N-1 through 404N-N, respectively. Computer systems 404B-1 through 404B-N and computer systems 404N-1 through 404N-N are collectively referred to as computer systems 404B through 404N, respectively.

Networks 402A through 402N are collectively referred to as networks 402. Computer systems 404A-1 through 404A-N through 404N-1 through 404N-N are collectively referred to as computer systems 404. The particular type of and configuration of networks 402 and computer systems 404 are not essential to this embodiment of the present invention.

Networks 402, and particularly computer systems 404, are coupled to a central computer system 412 by network 410. In the present embodiment, dynamic security policy application 106 is executing on central computer system 412. In one embodiment, dynamic security policy application 106 can be part of a network security application having one or more security policies. One example of a network security application having one or more security policies is Symantec Enterprise Security Manager (available from Symantec Corporation, Cupertino, Calif.).

Central computer system 412 can include, but is not limited to, an operating system, a processor, one or more memories, input/output interfaces, including network interfaces, as well as input/output devices, such as a display, a keyboard, a mouse, a floppy disc drive, and a CD-ROM drive. Network 410 is any network or network system that is of interest to a user.

In one embodiment, the operations of methods 200 and 300 are implemented at a network level on computer system 400. In one embodiment, risk factors include empirical security related information associated with computer system 400, i.e., at the network level. For example, in one embodiment, a risk factor includes results of a network related vulnerability scan, such as identification of ports that are open, of vulnerable services, and of computer systems having a detected infection. Thus, dynamic security policy application 106 can be utilized at the network level to dynamically generate a network level risk profile (method 200), including network level related risk categories generated using network level related risk factors, and to dynamically set a network security policy (method 300).

In some embodiments, risk factors for computer system 400 include network level related empirical security information as well as empirical security information related to individual computer systems 404 and/or users of computer systems 404 and or networks 402. In one embodiment, each risk factor is tagged or otherwise associated with a network, a respective computer system 404, and/or a user on computer system 400. In one embodiment, the risk profile includes risk categories that are associated with network level risk factors as well as risk categories that are associated with specific computer systems 404, networks 402, and/or users on computer system 404.

Thus, in accordance with one embodiment of the invention, a risk profile composed of one or more risk categories is generated and dynamically updated from risk factors logged over time to a risk profile database. The risk profile can be made available for use by other applications in decision making.

In one embodiment, the risk profile is used to dynamically set security policies, such as default security policies, for a computer system and/or a user. The various embodiments of the invention can be implemented on a host computer system as well as on computer system including a plurality of networked computer systems, e.g. on a network.

Embodiments in accordance with the invention, permit security policies applied to a computer system and/or user to be dynamically set and updated allowing security policy aggressiveness to be dynamically increased or decreased over time based on the risk profile.

Referring again to FIG. 1, dynamic security policy application 106 is in computer memory 112. As used herein, a computer memory refers to a volatile memory, a non-volatile memory, or a combination of the two.

Although dynamic security policy application 106 is referred to as an application, this is illustrative only. Dynamic security policy application 106 should be capable of being called from an application (e.g., a security application) or the operating system (e.g., operating system 104).

In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for host computer and client-server configurations, embodiments of the present invention may be carried out using any suitable means and/or hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, and servers on a network. Further herein, a means for performing a particular function is accomplished using the appropriate computer-readable code and the related hardware necessary to performing the function.

As illustrated in FIG. 1, this medium may belong to the computer system itself. However, the medium also may be removed from the computer system. For example, dynamic security policy application 106 may be stored in memory 136 that is physically located in a location different from processor 108. Processor 108 should be coupled to memory 136. This could be accomplished in a client-server system, or alternatively via a connection to another computer via modems and analog lines, or digital interfaces and a digital carrier line.

More specifically, in one embodiment, host computer system 102 and/or server computer system 130 is a portable computer, a workstation, a two-way pager, a cellular telephone, a digital wireless telephone, a personal digital assistant, a server computer, an Internet appliance, or any other device that can execute the dynamic security policy functionality in accordance with at least one of the embodiments as described herein. Similarly, in another embodiment, host computer system 102 and/or server computer system 130 is comprised of multiple different computers, wireless devices, cellular telephones, digital telephones, two-way pagers, or personal digital assistants, server computers, or any desired combination of these devices that are interconnected to perform, the processes as described herein.

In view of this disclosure, the embodiments of the present invention can be implemented in a wide variety of computer system configurations. In addition, the embodiments of the present invention can be stored as different modules in memories of different devices.

For example, dynamic security policy application 106 could initially be stored in server computer system 130, and then as necessary, a portion of dynamic security policy application 106 could be transferred to host computer system 102 and executed on host computer system 102. Consequently, part of dynamic security policy application 106 would be executed on processor 134 of server computer system 130, and another part would be executed on processor 108 of host computer system 102.

In yet another embodiment, dynamic security policy application 106 is stored in memory 136 of server computer system 130. Dynamic security policy application 106 is transferred over network 126 to memory 112 in host computer system 102. In this embodiment, network interface 138 and I/O interface 110 would include analog modems, digital modems, or a network interface card. If modems are used, network 126 includes a communications network, and dynamic security policy application 106 is downloaded via the communications network. In view of this disclosure, those of skill in the art can implement various embodiments of the present invention in a wide-variety of physical hardware configurations using an operating system and computer programming language of interest to the user.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
    logging risk factors occurring on a first computer system over time, said risk factors including activity of a user using said first computer system;
    dynamically generating a risk profile based on at least one of said risk factors, said risk profile associated with said user;
    dynamically updating said risk profile based on said logging;
    dynamically setting a security policy of said first computer system based on at least a portion of said risk profile;
    storing said risk profile at a memory location accessible by said first computer system and a second computer system;
    dynamically accessing said risk policy from said second computer system upon assignment of said user to said second computer system; and
    dynamically setting a security policy of said second computer system based on at least a portion of said risk profile.

2. The method of claim 1, further comprising:
    dynamically setting one or more default initial security settings on said first and second computer systems based on at least a portion of said risk profile.

3. The method of claim 1, further comprising:
    prioritizing virus definition distribution to said first and second computer systems based on at least a portion of said risk profile.

4. The method of claim 1, further comprising:
    performing an initial security assessment of said first and second computer systems.

5. The method of claim 1, wherein said risk profile includes one or more risk categories.

6. The method of claim 5, wherein each of said one or more risk categories includes a risk measure.

7. The method of claim 5, wherein said risk factors are associated with one or more of said one or more risk categories.

8. The method of claim 1, wherein said dynamically generating a risk profile comprises:
    generating one or more risk categories based on some or all of said risk factors, wherein said one or more risk categories collectively represent said risk profile.

9. The method of claim 1, further comprising:
    making at least a portion of said risk profile available for use by applications in said dynamically setting a security policy.

10. The method of claim 1, further comprising:
    tagging each of said risk factors with an identifier corresponding to at least one of a group consisting of a risk category, a computer system, a user, and a network.

11. The method of claim 1, further comprising:
    utilizing at least a portion of said risk profile to select a warning message displayed to said user.

12. The method of claim 1, wherein said risk factors are logged to a risk profile database.

13. The method of claim 1, further comprising:
    making at least a portion of said risk profile available for use by applications in decision making.

14. A computer-program product comprising a computer readable storage medium containing computer program code for implementing a method comprising:
    logging risk factors occurring on a first computer system over time, said risk factors including activity of a user using said first computer system;
    dynamically generating a risk profile based on at least one of said risk factors, said risk profile associated with said user;
    dynamically updating said risk profile based on said logging;
    dynamically setting a security policy of said first computer system based on at least a portion of said risk profile;
    storing said risk profile at a memory location accessible by said first computer system and a second computer system;
    dynamically accessing said risk policy from said second computer system upon assignment of said user to said second computer system; and
    dynamically setting a security policy of said second computer system based on at least a portion of said risk profile.

15. The computer-program product of claim 14, wherein the method further comprises:
    making at least a portion of said risk profile available for use by applications in decision making.

16. A security product comprising:
    a memory;
    a processor coupled to said memory;
    a dynamic security policy application for logging risk factors occurring on a first computer system over time, said risk factors including activity of a user using said first computer system;
    said dynamic security policy application further for dynamically generating a risk profile based on at least one of said risk factors, said risk profile associated with said user;
    said dynamic security policy application further for dynamically updating said risk profile based on said logging;
    said dynamic security policy application further for dynamically setting a security policy of said first computer system based on at least a portion of said risk profile;
    said dynamic security policy application further for storing said risk profile at a memory location accessible by said first computer system and a second computer system;

said dynamic security policy application further for dynamically accessing said risk policy from said second computer system upon assignment of said user to said second computer system; and said dynamic security policy application further for dynamically setting a security policy of said second computer system based on at least a portion of said risk profile.

17. A method comprising:

logging risk factors occurring on a computer system over time, said risk factors including activity of a first user and a second user using said computer system;

dynamically generating a first risk profile associated with said first user and a second risk profile associated with said second user based on said risk factors;

dynamically accessing said first risk profile upon assignment of said first user to said computer system;

dynamically setting a first security policy for said computer system based on said first risk profile;

dynamically accessing said second risk profile upon assignment of said second user to said computer system; and dynamically setting a second security policy for said computer system based on said second risk profile.

* * * * *